United States Patent Office 2,847,343
Patented Aug. 12, 1958

2,847,343

ETHOXYLINE RESIN COMPOSITIONS AND THEIR PREPARATION

Leo S. Kohn, Schenectady, N. Y., assignor to General Electric Company, a corporation of New York No Drawing. Application March 7, 1957
Serial No. 644,483

5 Claims. (Cl. 154—140)

This invention relates to new and useful resin compositions. More particularly, the invention relates to resin compositions having desirable physical, chemical and electrical properties, including long pot life and rigidity at room temperature and a rubbery or flexible character at elevated temperatures.

Epoxy, epoxide or ethoxyline resins, as they are variously called, are well known in the art. Generally, such epoxy resins comprise a polyether derivative of a polyhydric organic compound, said derivative containing 1,2 epoxy groups, said compounds being selected from the class consisting of polyhydric alcohols and phenols containing at least two phenolic hydroxy groups. For example, U. S. Patents 2,324,483 to Castan discloses epoxy resin compositions comprising the reaction product of phenols having at least two phenolic hydroxy groups and an epihalogenohydrin such as epichlorohydrin, the product having at least two epoxy groups and being cured to a thermoset, infusible mass by the use of a carboxylic or polybasic acid or acid anhydride such as phthalic anhydride. The use of organic amine type materials to cure epoxy resins is also well known as set forth, for example, in Patent 2,444,333, such materials often giving a rapid cure at room temperature. Usually, however, the pot life of amine cured epoxy resins is comparatively short and their high temperature characteristics are often poor. The use of boron trifluoride-amine complex materials as epoxy resin curing agents is also well known as disclosed, for example, in Greenlee Patent 2,717,885. However, epoxy resin compositions so cured are usually rigid, both at room temperature and at high temperatures.

While in many applications the hard and rather brittle epoxy resinous compositions which are normally attained with polybasic acid or anhydride, amine, or boron trifluoride-amine complex type cures are very useful, it is sometimes desirable that a resin used as an adhesive filler, coating and the like in conjunction with other structures such as wires, laminates, etc. which expand at elevated temperatures be rubbery or flexible at such temperatures to prevent the temperature-induced disruptive forces from tearing the structure apart. Thus, in the stator coils of electrodynamic machines, the conductor bars of which are insulated with a resinous material, it is desirable that at high operating temperatures of the order of 80° C. and above the insulating resin be rubbery and flexible so that it will conform to the expansion and warping of the conductor bars. By this is not meant simply heat distortion of the resin which is permanent, but an ability to yield under high temperature produced stresses and to substantially recover therefrom upon the release of the stress when the temperature is lowered, the resin composition returning to the rigid state.

A principal object of this invention is to provide new epoxy resin compositions which have desirable physical, chemical and electrical characteristics including low power factor, long pot life and the ability even though rigid at ordinary temperatures of becoming rubbery and flexible at elevated temperatures.

Briefly, the invention comprises epoxy resin compositions having as curing agent boron trifluoride ($BF_3$) organic base complex material and a lactam material or mixture of lactams, the cured resin having desirable qualities, including flexibility at high temperatures and rigidity at ordinary temperatures. For each 100 parts, by weight, of epoxy resin from 5 to 20 parts by weight of the lactam material are used and preferably 10 to 15 parts, by weight, while the boron trifluoride-organic base complex material is used in the amount of 2 to 6 parts, by weight, and preferably in the amount of 3 to 4.5 parts by weight. The epoxy resin used preferably has an epoxide equivalent of 175 to 375 and most preferably from 175 to 210. Too much lactam produces a material which is rigid at room temperature but weak at elevated temperatures; too little lactam produces a material which is rigid at high temperatures as well as at room temperature. Too much $BF_3$-amine complex produces too rapid a cure; too little $BF_3$-amine complex produces an improperly cured material.

The ethoxyline resins used in conjunction with my invention are, as pointed out above, well known in the art. They are described in Castan United States Patent Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2 propane. United States Patent Nos. 2,494,295, 2,500,600 and 2,511,913 describe further ethoxyline resins which can be used in conjunction with my invention. The above patents are hereby incorporated by reference in his application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:
where $n$ has an average value ranging from 0 to about 7. Such ethoxyline resins are sold under the name of Epon $$HO-\underset{CH_3}{\underset{|}{\overset{CH_3}{\overset{|}{C}}}}-\phantom{X}-OH + Cl-CH_2-CH\underset{O}{\diagdown}CH_2 \xrightarrow{Alkali}$$

$$CH_2-CH-CH_2-\left[-O-\underset{CH_3}{\underset{|}{\overset{CH_3}{\overset{|}{C}}}}-O-CH_2-CH-CH_2-\right]_n-O-\underset{CH_3}{\underset{|}{\overset{CH_3}{\overset{|}{C}}}}-O-CH_2-CH-CH_2$$

by Shell Chemical Corporation, under the name Araldite by the Ciba Company, as ERL resins by the Bakelite Company, and as Epi-Rez resins by the Devoe & Raynolds Company. The data given below for such resins is representative.

TABLE I

| Epoxy Resin | Epoxide Equivalent | M. P., ° C. |
|---|---|---|
| Epon 828 | 192 | 9 |
| Epon 834 | 225–290 | 20–28 |
| Epon 1064 | 300–375 | 40–45 |
| Araldite 6010 | 192 | Liquid |
| Araldite 6020 | 200–205 | Liquid |
| ERL 2774 | 175–200 | Liquid |
| Epi-Rez 510 | 175–200 | Liquid |

The lactams useful in connection with the invention include pyrrolidone, piperidone and ε-caprolactam, among others. In general, any compound having the well-known lactam group and no other constituent reactive with epoxy resins is useful. Thus, morpholone containing an oxygen atom in the ring is useful as are compounds containing a sulphur atom. Mixtures of lactams are also useful and the term "lactam" will be understood to include such mixtures. It has been found that a lactam material used alone is not an efficacious curing agent for epoxy resins. When 15 parts by weight of ε-caprolactam were added to 100 parts by weight of Araldite 6020 and the mixture heated at 135° C. to 150° C., no curing action had taken place after more than 72 hours of such heating.

The boron trifluoride-organic base complex materials used herein are also well known in the art. They are conveniently prepared by adding to an ether solution of base amine as desired an ether solution of a boron trifluoride-ether complex. They can also be prepared by simply bubbling boron trifluoride gas through an ether solution of a base. Preferably alkyl ethers are used such such as methyl, ethyl, propyl, butyl, etc. or mixed alkyl ethers as well as aryl ethers, alkaryl and aralkyl ethers. Among the amines which can be used are methyl amine, ethyl amine, propyl amine, butyl amines, aniline, diethyl aniline, toluidines, chloroaniline, nitroaniline and piperidine. Also useful in the present invention are complexes prepared as above of boron trifluoride with materials such as phenol and etherate complexes alone as used in conjunction with the lactams. Other suitable ethers and base materials will occur to those skilled in the art. A $BF_3$-ethylamine complex material is commercially available from the Shell Chemical Company and is known as $BF_3$-400. It will be understood that the term $BF_3$-organic base complex includes complexes of $BF_3$ with different organic bases as well as single organic bases, as well as mixtures of different $BF_3$-complexes. When a $BF_3$-organic base complex material is used as such to cure epoxy resins, the resulting compositions are rigid at all temperatures up to about 135° C. On the other hand, when as taught in this invention the $BF_3$-organic base complex material is used in conjunction with a lactam as a curing agent for epoxy resins, the resulting compositions, while rigid at room temperature, are flexible, rubbery and tough at elevated temperatures. The lactam and $BF_3$-organic base complex material can be combined with the epoxy resin in any desired sequence. Thus, the $BF_3$-organic base complex material and lactam may be added together to the epoxy resin which is heated to a temperature of about 80° C. to facilitate solution. Alternatively, the $BF_3$-organic base complex material can first be added to the epoxy resin and then the lactam added thereto. The lactam material can also be added to the heated epoxy resin followed by addition of the $BF_3$-organic base complex material.

The following examples are illustrative of the practice of the invention, all parts being by weight.

*Example 1*

To 100 parts by weight Epon 828, which had been heated to a temperature of about 80° C., there were added 10 parts by weight of ε-caprolactam. After the lactam material had dissolved with stirring in about 2 minutes, there were added 3 parts by weight of $BF_3$-ethylamine complex material which dissolved in about 5 minutes. The homogeneous mixture was cured for 16 hours at 135° C. and gave a product which in a 100 mil thick sheet could be bent upon itself at a temperature of 135° C., whereas it was rigid at room temperature. At 135° C., the material resisted penetration by a knife.

*Example 2*

Example 1 was repeated except that there was first added to 100 parts by weight of Epon 828, 6 parts by weight of $BF_3$-ε-caprolactam complex material followed by the addition of 7 parts by weight of ε-caprolactam. The homogeneous mixture was cured for 20 hours at 135° C. and had characteristics similar to that of Example 1.

*Example 3*

There were added to 100 parts by weight of ERL resin 2774, 3 parts by weight of $BF_3$-ethylamine complex material which was dissolved followed by the addition of 20 parts by weight of ε-caprolactam. The resulting homogeneous mixture when cured for 20 hours at 135° C. was rigid at room temperature. However, at a temperature of about 135° C., a 100 mil thick sheet of the material was very flexible. However, it was readily penetrated with a knife.

*Example 4*

Example 1 was repeated, using 100 parts by weight of Araldite 6010, 4.5 parts by weight of $BF_3$-ethylamine complex material and 10 parts by weight of ε-caprolactam. When this material was heated at 100° C. with stirring for 1½ hours, the material thickened and was tack-free at room temperature. When the material was cured at 135° C. for 16 hours, the resulting composition had the same characteristics as that of Example 1 above.

*Example 5*

Example 1 was repeated using 100 parts by weight Araldite 6010, 10 parts by weight of 2-pyrrolidone and 4.5 parts by weight of $BF_3$-ethylamine complex material which was added in that order. The resulting homogeneous mixture when cured for 20 hours at 135° C. gave a product having physical characteristics similar to that of Example 1.

*Example 6*

Example 1 was repeated using 100 parts by weight of Araldite 6020, 15 parts by weight of 2-pyrrolidone and 2.0 parts by weight of $BF_3$-ethylamine complex added in that order. When the resulting homogeneous mixture was cured for 20 hours at 135° C., the cured material was even more flexible than that of Example 1 above. While hot or heated to a temperature of 135° C., it could be penetrated with a knife.

*Example 7*

Example 1 was repeated using 100 parts by weight of Araldite 6020, 5 parts by weight of $BF_3$-2-pyrrolidone complex and 10 parts by weight of 2-pyrrolidone added in that order. When the resulting homogeneous mixture was cured for 20 hours at 135° C., the cured composition had characteristics comparable to that of Example 1.

*Example 8*

Example 1 was repeated using 100 parts by weight of Araldite 6010, 4.5 parts by weight of $BF_3$-ethylamine complex material and 5 parts by weight of 2-pyrrolidone added in that order. When the resulting homogeneous mixture was cured for 20 hours at 135° C., the material at 135° C. was slightly flexible in 100 ml thick sheet form and rather hard.

*Example 9*

Example 1 was repeated using 100 parts by weight of Epon 828, 6 parts by weight of $BF_3$-ethylamine complex material and 15 parts by weight of 2-pyrrolidone added in that order. The resulting composition when cured for 20 hours at 135° C. was more flexible than the material of Example 1, and could be penetrated with a knife in the hot condition.

*Example 10*

There were mixed together as above 100 parts by weight of Araldite 6010, 10 parts by weight of 2-pyrrolidone and 3 parts by weight of $BF_3$-dibutyl etherate, the materials readily forming a homogeneous mixture.

Upon heating at 135° C. the mixture began to thicken in about 2 hours and was hard in about 16 hours and remained so at room temperature. At 135° C. the material was flexible and rubbery.

*Example 11*

Example 10 was repeated except that the 2-pyrrolidone was omitted. When heated at 135° C. this material foamed to a rigid mass in about 5 minutes.

*Example 12*

Example 10 was repeated using 3 parts by weight of $BF_3$-phenol complex in lieu of the $BF_3$-dibutyl etherate complex material. The mixture when cured at 135° C. for about 16 hours was rigid at room temperature and flexible and rubbery at 135° C.

Instead of continuously curing the compositions to the cured state, they can, as well, be cured to B-stage solids and then cured by heating further for about 1 hour at 135° C. to 150° C.

The epoxy resin compositions of this invention are very useful as potting compounds and for molding purposes. When dissolved in suitable well-known solvents, they are useful as impregnants for fibrous material as adhesives and as binders for laminates and other structures. They are useful as coating materials or electrical insulation for wires or electrical conductors which are required to have certain specific characteristics at particular temperatures. They can also be filled with the usual fillers in varying amounts to give compositions tailored to suit any particular need.

What I claim as new and desire to secure by Letters Patent of the United States is:

1. An impregnating and coating material comprising the heat reaction product of (1) 100 parts by weight of a complex epoxide resin having an epoxy equivalent of from 175 to 375, containing 1,2 epoxide groups and comprising a polyether derivative of a polyhydric organic compound selected from the class consisting of polyhydric alcohols and phenols, having at least two phenolic groups, (2) from 2 to 6 parts by weight of $BF_3$-organic base complex, and (3) from 5 to 20 parts by weight of lactam.

2. A composition of matter comprising the heat reaction product of (1) 100 parts by weight of a complex epoxide resin having an epoxy equivalent of from 175 to 375, containing 1,2 epoxide groups and comprising a polyether derivative of a polyhydric organic compound selected from the class consisting of polyhydric alcohols and phenols having at least two phenolic hydroxyl groups, (2) from 3 to 4.5 parts by weight of $BF_3$-organic base complex, and (3) from 10 to 15 parts by weight of lactam.

3. A laminated structure comprising laminae coated and impregnated with a composition of matter comprising the heat reaction product of (1) 100 parts by weight of a complex epoxide resin having an epoxy equivalent of from 175 to 375, containing 1,2 epoxide groups and comprising a polyether derivative of a polyhydric organic compound selected from the class consisting of polyhydric alcohols and phenols having at least two phenolic hydroxyl groups, (2) from 2 to 6 parts by weight of $BF_3$-organic base complex, and (3) from 5 to 20 parts by weight of lactam.

4. An electrical conductor coated with a composition of matter comprising the heat reaction product of (1) 100 parts by weight of a complex epoxide resin having an epoxy equivalent of from 175 to 375, containing 1,2 epoxide groups and comprising a polyether derivative of a polyhydric organic compound selected from the class consisting of polyhydric alcohols and phenols having at least two phenolic hydroxyl groups, (2) from 2 to 6 parts by weight of $BF_3$-organic base complex, and (3) from 5 to 20 parts by weight of lactam.

5. The process of curing an epoxy resin composition which comprises mixing together (1) 100 parts by weight of a complex epoxide resin having an epoxy equivalent of from 175 to 375, containing 1,2 epoxide groups and comprising a polyether derivative of a polyhydric organic compound selected from the class consisting of polyhydric alcohols and phenols having at least two phenolic hydroxyl groups, (2) from 2 to 6 parts by weight of $BF_3$-organic base complex, and (3) from 5 to 20 parts by weight of lactam, and heating said mixture.

References Cited in the file of this patent

UNITED STATES PATENTS

| 2,707,708 | Wittcoff | May 3, 1955 |
| 2,717,885 | Greenlee | Sept. 13, 1955 |

OTHER REFERENCES

Dunn: "Rubber and Plastics Age" (1954), volume 35, pp. 84–87.

Schildknecht: Polymer Processes, volume X, pp. 239–243 (1956).